(12) United States Patent
Henning et al.

(10) Patent No.: US 12,491,664 B2
(45) Date of Patent: Dec. 9, 2025

(54) MOLD ELEMENT FOR MANUFACTURING MICROSTRUCTURES

(71) Applicant: LTS Lohmann Therapie-Systeme AG, Andernach (DE)

(72) Inventors: Andreas Henning, Koblenz (DE); Sebastian Scherr, Neuhausel (DE); Stefan Erlhofer, Kempenich (DE)

(73) Assignee: LTS Lohmann Therapie-Systeme AG, Andernach (DE)

( * ) Notice: Subject to any disclaimer, the term of this patent is extended or adjusted under 35 U.S.C. 154(b) by 288 days.

(21) Appl. No.: 17/800,679

(22) PCT Filed: Feb. 11, 2021

(86) PCT No.: PCT/EP2021/053345
§ 371 (c)(1),
(2) Date: Aug. 18, 2022

(87) PCT Pub. No.: WO2021/165141
PCT Pub. Date: Aug. 26, 2021

(65) Prior Publication Data
US 2023/0347550 A1 Nov. 2, 2023

(30) Foreign Application Priority Data
Feb. 19, 2020 (DE) .................... 10 2020 104 306.6

(51) Int. Cl.
*B29C 33/00* (2006.01)
*A61M 37/00* (2006.01)
*B29C 39/24* (2006.01)
*B29C 39/26* (2006.01)

(52) U.S. Cl.
CPC ..... *B29C 33/0066* (2013.01); *A61M 37/0015* (2013.01); *B29C 39/24* (2013.01); *B29C 39/26* (2013.01); *A61M 2037/0053* (2013.01)

(58) Field of Classification Search
CPC .................. A61M 2037/0053; B29C 33/0066
See application file for complete search history.

(56) References Cited

U.S. PATENT DOCUMENTS

| 4,946,633 | A | 8/1990 | Saeki et al. |
| 8,603,384 | B2 | 12/2013 | Lüttge et al. |
| 10,828,478 | B2 | 11/2020 | Mcallister et al. |
| 2009/0171314 | A1 | 7/2009 | Ferguson |
| 2011/0042847 | A1 | 2/2011 | Ogawa et al. |
| 2019/0275310 | A1 | 9/2019 | Ross |
| 2021/0001103 | A1 | 1/2021 | Takano |

FOREIGN PATENT DOCUMENTS

| CN | 103691054 A | 4/2014 |
| CN | 106232159 A | 12/2016 |
| DE | 3814257 A1 | 11/1988 |

(Continued)

*Primary Examiner* — James Sanders
(74) *Attorney, Agent, or Firm* — The Webb Law Firm

(57) ABSTRACT

A mold element, in particular a casting mold for manufacturing microstructures, in particular microneedle arrays, includes a base body. On an upper side of the base body, several depressions for receiving material for manufacturing the microstructure are provided. In order to improve the quality of the microstructure to be manufactured, in particular during a drying process, channels are provided on the upper side of the base body, each of which is connected to at least one of the depressions.

9 Claims, 1 Drawing Sheet

(56) References Cited

FOREIGN PATENT DOCUMENTS

| | | | |
|---|---|---|---|
| DE | 19936235 | A1 | 2/2001 |
| EP | 2918307 | A1 | 9/2015 |
| EP | 3357862 | A1 | 8/2018 |
| JP | 200789792 | A | 4/2007 |
| JP | 2009220350 | A | 10/2009 |
| JP | 2010247535 | A | 11/2010 |
| JP | 2013248299 | A | 12/2013 |
| WO | 2009113519 | A1 | 9/2009 |
| WO | 2014073531 | A1 | 5/2014 |
| WO | 2017056894 | A1 | 4/2017 |
| WO | 2019188935 | A1 | 10/2019 |

MOLD ELEMENT FOR MANUFACTURING MICROSTRUCTURES

CROSS-REFERENCE TO RELATED APPLICATIONS

This application is the United States national phase of International Application No. PCT/EP2021/053345 filed Feb. 11, 2021, and claims priority to German Patent Application No. 10 2020 104 306.6 filed Feb. 19, 2020, the disclosures of which are hereby incorporated by reference in their entirety.

BACKGROUND OF THE INVENTION

Field of the Invention

The invention relates to a mold element, in particular a casting mold such as a die, for manufacturing microstructures. The microstructures to be manufactured are microneedle arrays, in particular.

Description of Related Art

Microneedles are used to deliver active ingredients directly into the skin, also known as intradermal delivery. For this purpose, the microneedles are just long enough to penetrate only the outer skin layers, but preferably not to reach nerves and blood vessels, thus leaving them unharmed. Nevertheless, microneedles create small holes in the upper skin layers, which significantly increases the absorption of active ingredients compared to a purely external application of active ingredients to the skin.

Microneedle arrays, which have a plurality of microneedles, for example attached to a carrier surface, can be used for short-term delivery or for long-term application. A preferred way of delivering the active ingredient from the microneedles into the skin is that areas of the microneedles containing active ingredient or the entire microneedle dissolve or detach and can thus be absorbed into the skin by the body. For this purpose, the microneedles are in particular, at least partially, made of water-soluble substances or materials, respectively. In addition to the direct delivery of active ingredients through the microneedles themselves, it is also possible for the microneedles to have pores or cavities or to be formed as hollow needles in order to enable active ingredient delivery to the skin in this way. Furthermore, microneedles can also be free of active ingredients. In this case, for example, the active ingredient can be applied externally to the outside of the microneedles, or a substance containing the active ingredient can be applied to the corresponding skin area only after the microneedles have been removed from the skin, in order to deliver active ingredients in this way using microneedles.

Microneedles can be made of ceramic, metal, or polymer, among other materials. Preferably, one or more active ingredient components are added to these materials, thus resulting in a formulation of the microneedles.

Previously known methods for manufacturing therapeutic or diagnostic microneedles or microneedle arrays, respectively, are not suitable or only suitable to a limited extent for manufacturing in sufficient quality and/or quantity.

A common method of manufacturing microneedles involves casting the microneedles or entire microneedle arrays, respectively, for example using casting molds such as dies made of silicone. In particular due to the hydrophobic properties between the casting mold and the formulation applied to it, which is usually liquid, numerous problems arise in such manufacturing methods.

In particular, when applying aqueous liquids across the entire surface of the casting mold in a die usually made of silicone, there is the problem that, due to the hydrophobic properties of the casting mold, the liquid is not evenly distributed and may not reach all the depressions in the casting mold forming the microneedles.

Furthermore, there is the problem that the applied liquid, which is either an aqueous or other solvent, must dry. During the drying process and the associated volume reduction, cavities may occur, for example, so that the corresponding product cannot be used. Internal stresses can also occur during drying, often resulting in increased brittleness of the product. Such stresses can only be reduced, for example, by complex thermal post-treatments. In this respect, known processes for manufacturing microstructures, in particular microneedle arrays, have the problem that, on the one hand, a relatively large amount of scrap is manufactured and/or, on the other hand, complex post-treatment of the product is required.

SUMMARY OF THE INVENTION

An object of the present disclosure is to provide a mold element, such as a casting mold, in particular a die, with which microstructures such as microneedle arrays can be manufactured with improved quality.

The object is achieved with a mold element having the features as described herein.

The mold element according to the present disclosure, which is in particular a casting mold such as a die made of silicone, for example, is used to manufacture microstructures, in particular microneedle arrays. The mold element comprises a base body having a particularly flat upper side. Depressions for receiving material for manufacturing the microstructure extend from the upper side. According to the present disclosure, channels are provided on the upper side of the base body, each of which is connected to at least one of the depressions. Providing such channels on the upper side, ensures a more targeted drying, for example by a corresponding flow of material into the depression. The upper side is particularly flat, even if it has channels open towards the upper side; flat upper side being understood to mean that, in a preferred embodiment, this is not a convexly or concavely curved upper side.

Preferably, each depression is connected with several channels. Thus, the quality of the manufactured product, in particular of the manufactured microneedle arrays, can be further improved. In this respect, it is preferred that the several channels are arranged uniformly around the perimeter of the depression. Here, it is further preferred that each depression is connected to at least three, in particular at least five channels.

Preferably, the channels are at least partially arranged such that individual channels connect neighboring depressions with each other. This results in a very good distribution of the product during the drying process, so that the quality of the obtained product can be further improved.

Preferably, the channels are at least partially formed such that they taper, starting from the depression with which they are connected. This can also improve the quality of the manufactured product.

In a particularly preferred further embodiment of the present disclosure, a connection area or a transition area, respectively, between a channel and a depression is provided with a chamfer. In particular, in a longitudinal section, the chamfer is preferably formed such that the depth of the channel, measured from the upper side of the base body, increases the closer the channel is to the depression. It is particularly preferred that the chamfer has a radius in this area or is curved, respectively. Here, the curvature is preferably formed such that it projects into the connecting channel or is convex relative to the channel, respectively. Thus, the depth of the channel increases steadily towards the depression, in particular. In particular, the channel has no steps or ledges.

The depressions provided in the base body are preferably arranged such that they are arranged offset from one another in plan view. In particular, rows of depressions are provided, the depressions of neighboring rows each being arranged on gap.

In a preferred embodiment, since the depressions are used to form a microneedle array, the individual depressions are preferably conical or pyramidal, with the apex of the cone or pyramid being on the side facing away from the upper side of the base body. Starting from the upper side, the cones or pyramids thus taper in the longitudinal direction, or the cross-section of the cones or pyramids decreases in the longitudinal direction, respectively. In a preferred embodiment, the cones/pyramids themselves have a circular or square cross-section.

In a particularly preferred further embodiment of the present disclosure, at least one bar is provided in at least one depression. Providing at least one bar in at least one depression is an independent proposed solution, in particular independent of providing at least one channel on the upper side of the base body. However, the combination of both proposed solutions is preferred.

Preferably, at least one bar is provided in several, in particular in each depression. In a preferred further embodiment of the present disclosure, the at least one bar extends in the longitudinal direction of the depression. In particular, the bar is arranged on a wall of the depression. Furthermore, it is preferred that the at least one bar extends across at least half of the depression in longitudinal direction.

BRIEF DESCRIPTION OF THE DRAWINGS

In the following, the present disclosure is described in more detail by means of a preferred embodiment with reference to the accompanying drawings.

In the drawings.

DESCRIPTION OF THE INVENTION

Figure 1:
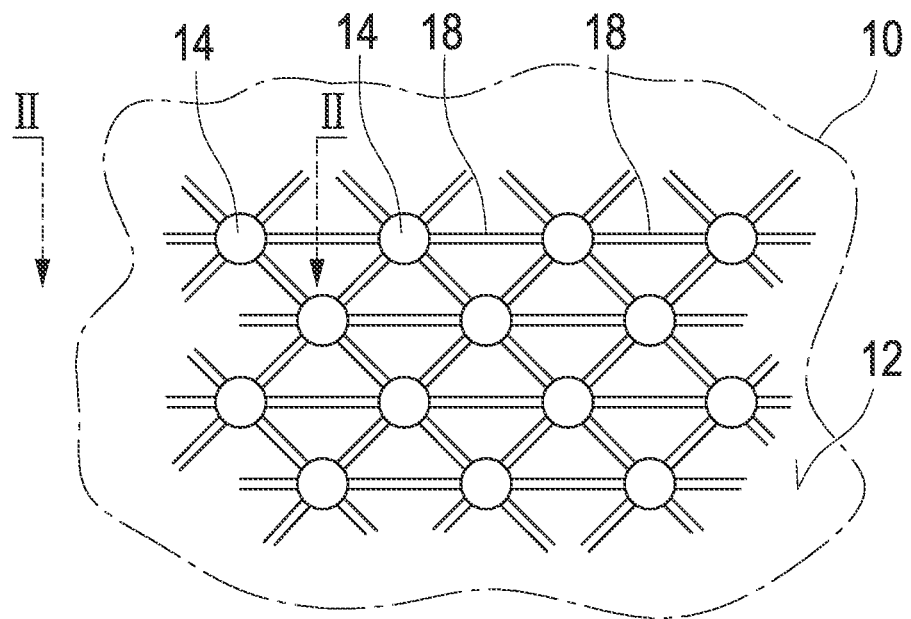
FIG. 1 shows a schematic plan view of a preferred embodiment of a mold element in the form of a die according to the present disclosure.
Figure 2:
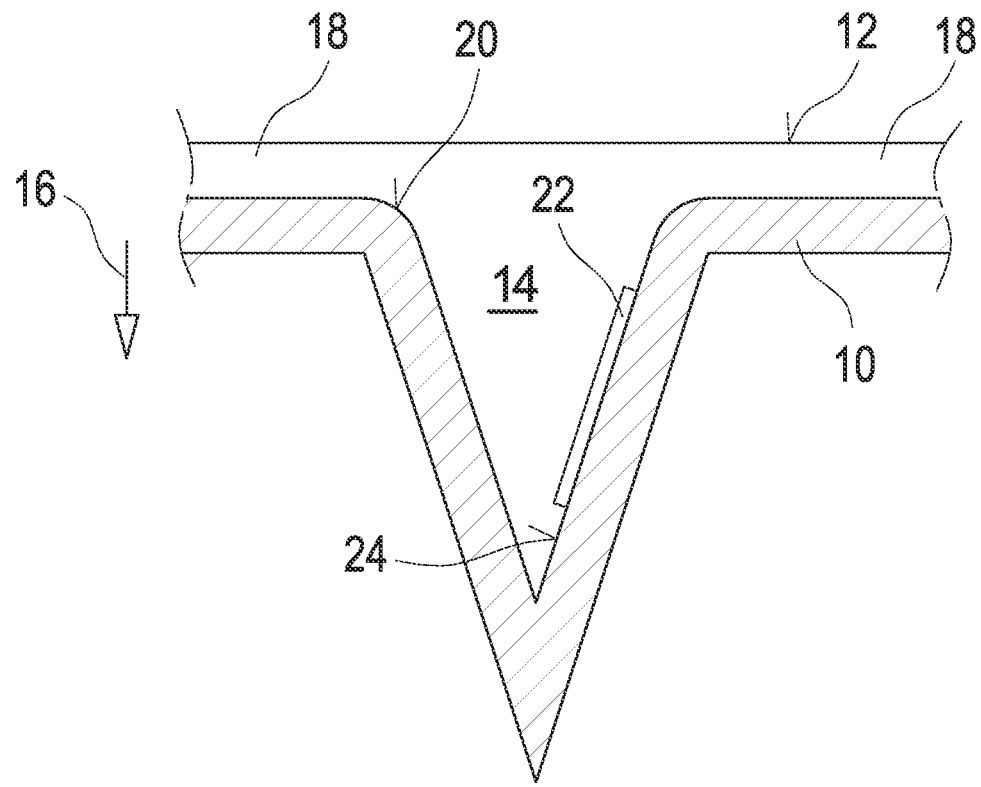
FIG. 2 shows a schematic, greatly enlarged sectional view in longitudinal direction of a depression of the die.

The schematically shown die has a base body 10. Starting from an upper side 12 of the base body 10, a plurality of depressions 14 are arranged in the base body. The depressions are conical in cross-section (FIG. 2), with the cones tapering from the upper side 12 in the longitudinal direction 16 of the depression 14.

On the upper side 12 of the base body 10, channels 18 are provided. The channels 18 are preferably arranged such that neighboring depressions 14 are connected to each other through the channels 18. In particular, in the preferred embodiment shown, a depression 14, which is not arranged at the edge of the die, has six connection channels 18 to the six surrounding depressions 14.

In the preferred embodiment shown, the connection channels 18 have a chamfer 20 in a transition area to the depressions 14. The chamfer 20 is preferably curved, the curvature being convex relative to the channel 18. A depth of the channel 18, measured from the upper side 12, thus increases towards the depression 14.

In a preferred further embodiment of the present disclosure, which is an independent proposed solution, at least one bar 22 is provided within the depression 14. The bar 22 is arranged at an inner wall 24 of the depression and extends in particular in longitudinal direction 16 of the depression 14.

The invention claimed is:

1. A casting mold element for manufacturing microneedle arrays comprising:
   a base body having an upper side and a lower side, wherein the base body is formed from one piece with a negative image of the microneedle array extending away from the upper side of the base body to the lower side; and
   depressions extending from the upper side of the base body towards the lower side, the depressions designed to receive material for manufacturing the microneedle array,
   wherein channels are provided on the upper side of the base body, each of which is connected to at least one of the depressions,
   wherein a chamfer is provided in a connection area between a channel and a depression such that the chamfer is curved, with the curvature being convex relative to the channel such that a depth of the channel measured from the upper side increases towards the depression, and
   wherein the depressions are conical in longitudinal direction and the depressions are arranged offset from one another in plan view.

2. The mold element according to claim 1, wherein each depression is connected with two or more channels.

3. The mold element according to claim 1, wherein at least a part of the channels connects neighboring depressions with each other.

4. The mold element according to claim 1, wherein at least a part of the channels tapers from the respective depression.

5. The mold element according to claim 1, wherein at least one bar is provided in at least one depression.

6. The mold element according to claim 5, wherein at least one bar extends in longitudinal direction of the depressions.

7. The mold element according to claim 1, wherein each depression provides the casting mold for a microneedle.

8. The mold element according to claim 1, wherein the form of each depression corresponds to the negative image of a microneedle.

9. The mold element according to claim 1, wherein the depth of the channel measured from the upper side increases towards a tip of the depression.

* * * * *